(12) United States Patent
Golowka et al.

(10) Patent No.: US 6,388,833 B1
(45) Date of Patent: May 14, 2002

(54) METHOD FOR MANUFACTURING A DISK DRIVE HAVING AN OVERWRITEABLE CLOCK TRACK

(75) Inventors: Daniel Michael Golowka; David Michael Suckling, both of Rochester, MN (US)

(73) Assignee: Western Digital Technologies, Inc., Lake Forest, CA (US)

(*) Notice: Subject to any disclaimer, the term of this patent is extended or adjusted under 35 U.S.C. 154(b) by 0 days.

(21) Appl. No.: 09/106,425

(22) Filed: Jun. 29, 1998

(51) Int. Cl.$^7$ .............................................. G11B 5/596
(52) U.S. Cl. ...................................... 360/77.02; 360/51
(58) Field of Search ................................ 360/75, 77.08, 360/77.02, 51, 52, 47, 31; 369/48; 29/603.03

(56) References Cited

U.S. PATENT DOCUMENTS

| | | | | |
|---|---|---|---|---|
| 4,414,589 A | * | 11/1983 | Oliver et al. ............. | 360/77.02 |
| 4,484,238 A | * | 11/1984 | Vinal .......................... | 360/47 |
| 5,333,140 A | * | 7/1994 | Moraru et al. ............ | 360/75 X |
| 5,485,322 A | * | 1/1996 | Chainer et al. ............ | 360/75 X |
| 5,617,267 A | * | 4/1997 | Kawagoe et al. ......... | 360/75 X |
| 5,796,542 A | * | 8/1998 | Szeremeta ................. | 360/75 X |
| 6,046,969 A | * | 4/2000 | Towner et al. ............ | 369/48 |

FOREIGN PATENT DOCUMENTS

| | | | | |
|---|---|---|---|---|
| JP | 64-19516 | * | 1/1989 | ............ G11B/5/596 |
| JP | 64-37709 | * | 2/1989 | ............ G11B/5/596 |

OTHER PUBLICATIONS

IBM–TDB; v. 29, No. 10; Mar. 1987:; "Disk File Clock Writing".*

* cited by examiner

Primary Examiner—David Hudspeth
Assistant Examiner—K. Wong
(74) Attorney, Agent, or Firm—Milad G Shara (57) ABSTRACT

A method of manufacturing a disk drive having a rotary actuator and a disk. The rotary actuator includes a disk transducer head for reading and writing on the disk. The method includes the steps of placing the disk drive in a servo track writer. The servo track writer includes a clock head and means for moving the rotary actuator. The clock head includes an inner transducer and an outer transducer, the inner transducer and the outer transducer being radially spaced apart. A pair of continuous phase coherent radially spaced apart clock tracks are written with the clock head, the clock tracks comprising an outer clock track and an inner clock track wherein the inner clock track is disposed closer to an inner diameter of the disk than the outer clock track. A reference timing clock is read from either or both of the inner and outer clock tracks with the clock head. A portion of a servo track is written during a rotation of the disk with the disk transducer head, synchronized to the reference timing clock, the servo track portion including a series of equally spaced apart servo sector portions. The disk transducer head is incrementally moved in an arcuate path towards the inner diameter of the disk. The steps of reading the reference timing clock, writing a portion of the servo track, and incrementally moving the disk transducer head are repeated to write a complete set of servo tracks on the disk, wherein the servo sector portions form interruptions in the inner and outer clock tracks, and adjacent inner and outer clock track interruptions are circumferentially displaced from one another so as to enable a continuous stream of clock pulses to be read by the clock head.

12 Claims, 7 Drawing Sheets

A) PLACING THE DISK DRIVE IN A SERVO WRITER, THE SERVO WRITER HAVING A CLOCK HEAD AND MEANS FOR MOVING THE ROTARY ACTUATOR, THE CLOCK HEAD HAVING AN INNER TRANSDUCER AND AN OUTER TRANSDUCER, THE INNER TRANSDUCER AND THE OUTER TRANSDUCER BEING RADIALLY SPACED APART

150

B) WRITING A PAIR OF CONTINUOUS PHASE COHERENT RADIALLY SPACED-APART CLOCK TRACKS WITH THE CLOCK HEAD, THE CLOCK TRACKS COMPRISING OF AN OUTER TRACK AND INNER TRACK WHEREIN THE INNER TRACK IS DIPOSED CLOSER TO AN INNER DIAMETER OF THE DISK THEN THE OUTER TRACK

152

C) READING A REFERENCE TIMING CLOCK FROM EITHER OR BOTH OF THE INNER AND OUTER CLOCK TRACKS WITH THE CLOCK HEAD

154

D) WRITING A PORTION OF A SERVO TRACK DURING A ROTATION OF THE DISK WITH THE DISK TRANSDUCER HEAD, SYNCHRONIZED TO THE REFERENCE TIMING CLOCK, THE SERVO TRACK PORTION COMPRISING A SERIES OF EQUALLY SPACED APART SERVO SECTOR PORTIONS

156

E) INCREMENTALLY MOVING THE DISK TRANSDUCER HEAD IN AN ARCUATE PATH TOWARDS THE INNER DIAMETER OF THE DISK

158

F) REPEATING THE STEPS C-E TO WRITE A COMPLETE SET OF SERVO TRACKS ON THE DISK; WHEREIN THE SERVO SECTOR PORTIONS FORM INTERRUPTIONS IN THE INNER AND OUTER CLOCK TRACKS, AND ADJACENT INNER AND OUTER CLOCK TRACK INERRUPTIONS ARE CIRCUMFERENTIALLY DISPLACED FROM ONE ANOTHER SO AS TO ENABLE A CONTINUOUS STREAM OF CLOCK PULSES TO BE READ BY THE CLOCK HEAD

METHOD FOR MANUFACTURING A DISK DRIVE HAVING AN OVERWRITEABLE CLOCK TRACK

BACKGROUND OF THE INVENTION

1. Field of the Invention

The present invention relates to a disk drive and a method of manufacturing a disk drive such as a magnetic disk drive having a disk surface. More particularly, the present invention relates to placing the disk drive in a servo track writer having a dual transducer clock head which writes a pair of clock tracks in the data region of the disk surface, wherein the clock tracks are allowed to be partially overwritten while providing a continuous stream of reference timing information to the servo track writer during the servo writing process.

2. Description of the Prior Art

Hard disk drives store large volumes of data on one or more disks mounted on a spindle assembly. The spindle assembly includes a spindle motor for rotating the disks at a substantially constant angular velocity. Disk drives employ a disk control system for interfacing with a host (e.g., a computer) to control the reading and writing of data on a disk. Each disk includes up to two disk surfaces which are capable of storing data. On each disk surface, user data is stored on concentric circular tracks between an outside diameter and an inside diameter of the disk. Servo systems are employed to maintain alignment of a transducer head with a desired target data track (termed "track following"), for reading and writing user data on the disk surface within desired control parameters.

Embedded servo systems use servo data on the same disk surface as user data to provide control signals and information employed in the operation of the servo system. User data on the disk surface is divided into groups of data sectors. Embedded servo information is recorded in servo sectors placed in arcuate, radially continuous wedges between the groups of data sectors. In this regard, servo sectors are commonly referred to as "servo wedges". For example, a concentric data track may include 60 equally spaced servo sectors with data regions (i.e., a region containing data sectors, groups of data sectors or partial data sectors) located between adjacent pairs of servo sectors.

Each servo sector includes fields containing track identification used in track seeking operations and tracking information used in track following operations. For example, the track identification information may include track number or address and sector number, and the tracking information may include automatic gain control (AGC) and phase lock oscillator information (PLO), timing information (e.g. a servo sync word) and servo burst information for positioning a transducer head over the disk surface. The fields are defined by transitions written on the disk surface in patterns readable by the servo system.

During execution of a command to read or write data to a target data sector on the disk surface, servo information is sampled as the servo sectors pass under the associated transducer head. Sector timing is maintained by detecting a timing field within each servo sector.

During manufacturing of the disk drive a servo track writer is employed for precisely writing servo sectors on a disk surface. Because spindle motor speed variations can cause timing errors during the servo writing process, a timing system is utilized to write servo sectors at precise circumferential locations on the disk surface. A positioning system is utilized for positioning a write head to write servo sectors at precise radial locations on the disk surface. In one known method, the disk drive head disk assembly (HDA) is placed in a servo track writer. The positioning system is utilized for incrementally moving the rotary actuator from the outer diameter of the disk to the inner diameter of the disk while writing servo sectors to the disk (i.e., a servo track or a portion of a servo track). The timing system includes a clock head positioned over one of the surfaces of the disk, for writing a clock track on the disk surface. The clock track is used as a timing reference on the disk surface such that when servo sectors are written on the disk surface, the servo sectors are written at precisely located circumferential positions.

Conventionally, a clock track consists of a single track with a finite or known number of transitions written on the disk surface plus an index mark once per revolution. For example, the index mark may comprise an absence of transitions. The clock track is placed outside of the data area (where servo sectors are written on the disk), and typically is located near the outside edge of the disk. By locating the clock track near the outside edge of the disk, the servo track writer does not overwrite the clock track and thereby destroy timing information which may lead to the servo sectors being incorrectly written on the disk surface. There are known disadvantages associated with locating the clock track near the outer edge of the disk. The clock head used for writing the clock track on the disk is confined to a very small area at the outer edge of the disk. Very tight mechanical tolerances must be observed to correctly place the clock head. If placed incorrectly, the clock head will fall short of the targeted disk area, and the clock head and the disk may be damaged by landing on the chamfer of the disk. If the clock head is inserted too far into the head disk assembly, the clock track may be overwritten, which may stop or interrupt the servo writing process.

Other disadvantages exist in positioning the clock head very close to the outer edge of the disk. The outer edge of the disk is not certified by the manufacturer to retain proper tribology for flying heads. Tests have indicated that particulate counts are the highest at the outside diameter of the disk. The presence of defects at the outside diameter of the disk may require the clock track to be written to the disk many times before it is correct. During writing of the clock track on the disk surface, the clock head may pick up debris from the disk surface and contaminate a subsequent head disk assembly placed on the servo track writer.

The clock track provides timing synchronization pulses to update timing circuitry (such as a phase locked loop). It is known to write a clock track in the data region and coasting (postpone updating) the timing circuitry to allow the circuit to run at a fixed frequency while the clock head is passing over portions of the clock track overwritten by the servo sectors. However, while the timing circuitry is coasting, spindle motor speed variations can cause timing error and thereby imprecise location of servo sectors on the disk surface.

There is therefore an advantage to be realized if the clock track could be located in the cleaner, data portion of the disk surface while maintaining a timing reference to write servo sectors at precise locations on the disk surface.

SUMMARY OF THE INVENTION

The invention can be regarded as a method of manufacturing a disk drive having a rotary actuator and a disk. The rotary actuator includes a disk transducer head for reading and writing on the disk. The method includes the steps of placing the disk drive in a servo track writer, the servo track writer including a clock head and means for moving the rotary actuator. The clock head includes an inner transducer and an outer transducer, the inner transducer and the outer transducer being radially spaced apart with respect to the disk. The method includes writing a pair of continuous phase coherent radially spaced-apart clock tracks with the clock head, the clock tracks comprising an outer clock track and an inner clock track wherein the inner clock track is disposed closer to an inner diameter of the disk than the outer clock track. The method further includes reading a reference timing clock from either or both of the inner and outer clock tracks with the clock head. The method includes writing a portion of a servo track during a rotation of the disk with the disk transducer head, synchronized to the reference timing clock, the servo track portion comprising a series of equally spaced apart servo sector portions. Furthermore, the method includes incrementally moving the disk transducer head in an arcuate path towards the inner diameter of the disk.

The steps of reading the reference timing clock, writing a portion of the servo track and incrementally moving the disk transducer head are repeated to write a complete set of servo tracks on the disk. The servo sector portions form interruptions in the inner and outer clock tracks. Adjacent inner and outer clock track interruptions are circumferentially displaced from one another so as to enable a continuous stream of clock pulses to be read by the clock transducer.

The foregoing and other features of the invention are described in detail below and set forth in the appended claims.

DESCRIPTION OF THE PREFERRED EMBODIMENTS

Figure 1:
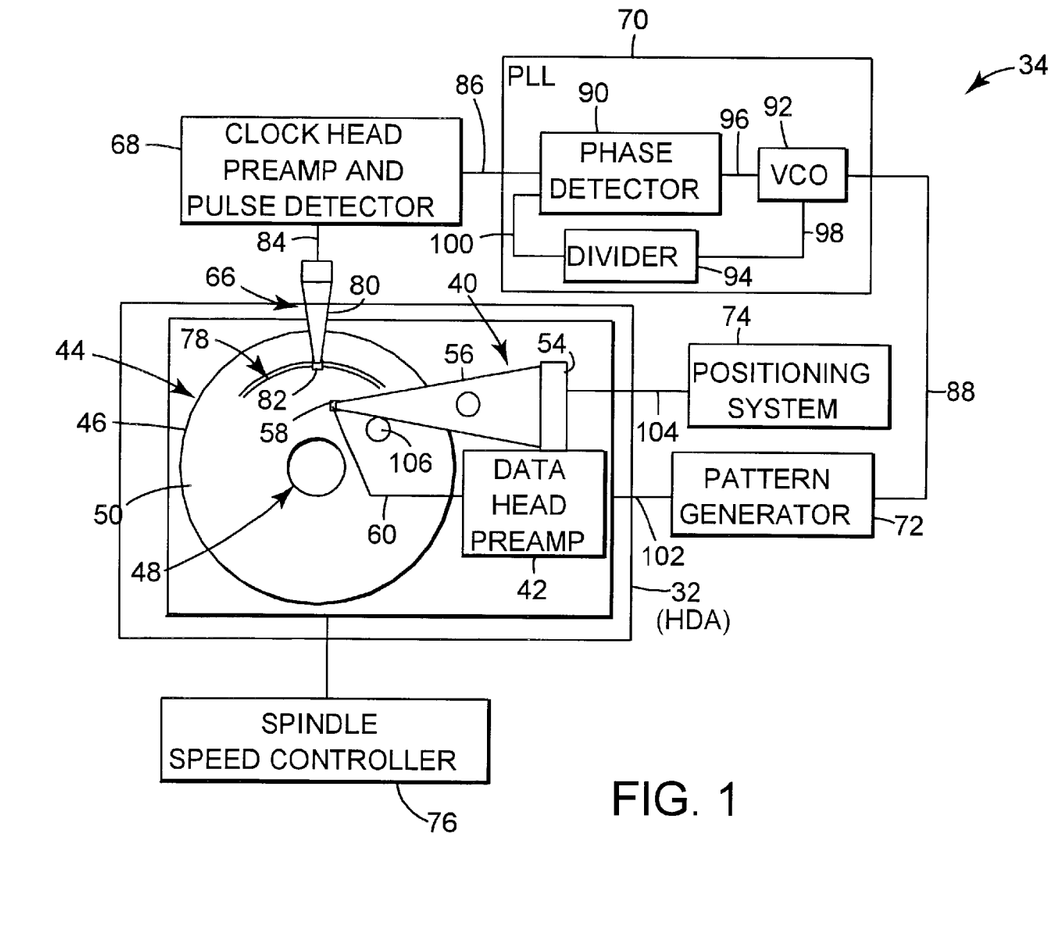
FIG. 1 is a block diagram showing a hard disk drive placed in a servo track writer to illustrate a method of manufacturing a hard disk drive in accordance with the present invention.

Referring to FIG. 1, a disk drive head disk assembly (HDA) 32 is placed in a servo track writer 34 to illustrate a method of manufacturing a hard disk drive according to a preferred embodiment of the invention. Servo track writer 34 is employed for precisely writing servo tracks (i.e., servo sectors) on disk surfaces associated with HDA 32. The servo track writer writes a pair of clock tracks in the cleaner, data region of a disk surface, wherein the clock tracks are allowed to be partially overwritten by the servo track writer 34 while providing a continuous stream of reference timing information to the servo track writer 34 during the servo writing process.

HDA 32 includes an actuator assembly 40, a data head preamplifier 42, and a disk assembly 44. Disk assembly 44 includes one or more magnetic media disks, such as indicated at 46. Disks 46 are stacked on a spindle assembly 48. Spindle assembly 48 is mechanically coupled to a spindle motor (not shown) for rotating disks 46 at a substantially constant angular velocity. Each disk 46 includes one or more disk recording surfaces (i.e., disk surfaces) capable of storing data thereon, such as indicated at 50.

Actuator assembly 40 includes a voice coil motor (VCM) 54 and one or more actuator arms 56 extending from VCM 54. Each actuator arm 56 corresponds to a respective disk surface, such as disk surface 50. A disk transducer head 58 is disposed at the end of each actuator arm 56, wherein each transducer head 58 is also associated with a corresponding disk surface 50.

During operation of the disk drive, transducer head 58 communicates with a disk control system (not shown) via preamplifier 42 for reading and writing data on the associated disk surface 50. Preamplifier 42 is electrically coupled to transducer head 58 by connecting means 60, for receiving and recording signals which are representative of magnetic transitions on a selected disk surface 50. While positioned within servo track writer 34 during the manufacturing process, transducer head 58 communicates with servo track writer 34 via preamplifier 42 for reading and writing servo sectors on the associated disk surface 50. Preamplifier 42 receives and transmits signals to and from a servo track writer pattern generator 72.

Actuator arm 56 is permanently coupled to VCM 54. Actuator assembly 40 is coupled to a positioning system 74 which controllably swings actuator arm 56 and the corresponding disk transducer head 58 incrementally over the associated disk surface 50 between an outside diameter and an inside diameter, for writing servo sectors on the associated disk surface.

Servo track writer 34 includes clock head assembly 66, clock head preamp and pulse detector (pulse detector) 68, phase locked-loop (PLL) 70, pattern generator 72, positioning system 74, and spindle speed controller 76. Clock head assembly 66 initially operates to write a pair of continuous phase coherent, radially spaced-apart clock tracks, indicated at 78, on disk surface 50. The pair of clock tracks 78 include an inner clock track 77 and an outer clock track 79 shown in FIG. 2. Clock assembly 66 also cooperates with pulse detector 68 and PLL 70 to provide a reference timing clock to pattern generator 72 by reading the pair of clock tracks 78. Pattern generator 72 operates to write a portion of a servo track during rotation of the disk 46, while rotatably controlled by spindle speed controller 76, synchronized to the reference timing clock. The servo track portion comprises a series of equally spaced apart servo sector portions. Positioning system 74 operates to incrementally move the disk transducer head 58 in an arcuate path from an outer diameter to an inner diameter of the disk for writing each servo track. Each system within servo track writer 34 is described in further detail in the following paragraphs.

Clock head assembly 66 includes clock arm 80 which extends over disk surface 50. A clock head 82 is disposed at the end of clock arm 80. Clock head 82 is electrically coupled to pulse detector 68 via connecting means 84. Clock head 82 communicates with pattern generator 72 via pulse detector 68 and PLL 70 for writing a pair of clock tracks 78 on disk surface 50 and subsequently reading the clock tracks 78 for providing the reference timing clock to the pattern generator 72. Clock head preamp and pulse detector 68 receives signals from clock head 82 which are representative of magnetic transitions making up the pair of clock tracks 78 on disk surface 50. Pulse detector 68 is electrically coupled to PLL 70 via connecting means 86 and provides a pulse signal to PLL 70.

PLL 70 operates to lock onto the reference timing clock provided by the pair of clock tracks 78, and provides a reference timing clock to pattern generator 72 which has been adjusted to compensate for any speed variations in the rotation of disk 46 during the writing of servo tracks on the disk surface 50. In one exemplary embodiment shown, PLL 70 includes phase detector 90, voltage controlled oscillator (VCO) 92, and divider 94. Divider 94 is electrically coupled to VCO 92 via connecting means 96. VCO 92 is electrically coupled to divider 94 via connecting means 98. Divider 94 is electrically coupled to phase detector 90 via connecting means 100. Phase detector 90 receives a reference timing clock signal from clock head 82 via pulse detector 68. Because pattern generator 72 writes servo sectors directly onto the disk surface 50 at a frequency that is much greater than the frequency of the reference timing clock produced from the clock tracks 78, voltage controlled oscillator 92 multiplies (increases) the frequency received from phase detector 90. Voltage controlled oscillator 92 provides an output signal to pattern generator 72 via connecting means 88. Further, the output of VCO 92 is input to phase detector 90 via divider 94, which reduces (divides) the signal frequency such that it is again in phase with the reference timing clock signal received from clock head 82. Phase detector 90 compares the reference timing clock received from clock head 82 with the output of divider 94 and generates a timing error signal which is output to VCO 92 via connecting means 96. In response to the timing error signal, the VCO 92 either increases or decreases the frequency of its output signal to maintain synchronization of the reference timing clock to the pattern generator 72.

Pattern generator 72 includes data stored in random access memory (RAM) which are representative of the desired servo sectors to be written on the disk surface 50. In response to the higher frequency reference timing clock signal received from PLL 70, pattern generator 72 detects a circumferential index reference point and by counting clock pulses from the index, generates output signals for writing transitions on the disk surface 50 representative of the desired servo sectors via preamp 42 at precisely located circumferential positions.

Positioning system 74 provides for radial positioning of the disk transducer head 58 during the servo writing process. Positioning system 74 is coupled to actuator 40 via connecting means 104. In one exemplary embodiment shown, positioning system 74 utilizes a laser interferometer positioning system for precisely incrementally moving the transducer head 58 in an arcuate path from track to track during the servo writing process. The actuator assembly 40 is biased against a push pin 106 by providing a DC current through VCM 54 to "push" it against the push pin 106. Push pin 106 is moved incrementally via positioning system 74. Because actuator arm 40 is biased against push pin 106, the actuator assembly 40 will follow the push pin 106 and incrementally move from track to track.

Figure 2:
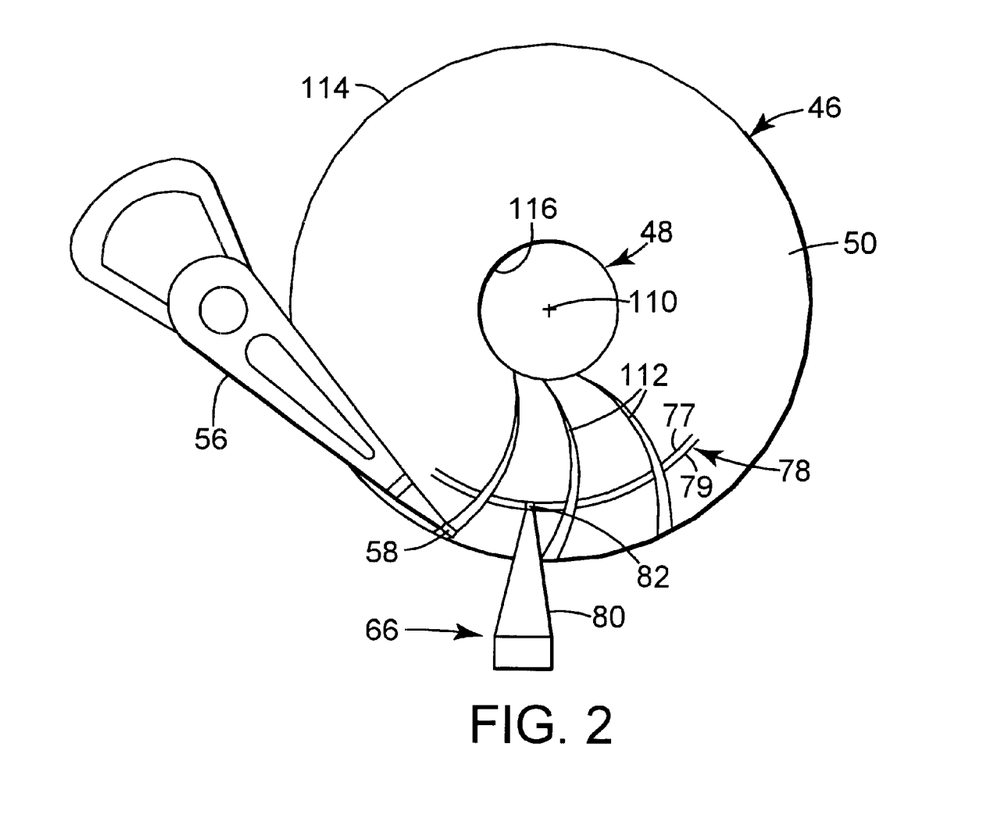
FIG. 2 is an enlarged partial plan view of a clock head disposed over a disk surface in the disk drive of FIG. 1, and a rotary actuator arm with attached slider assembly for positioning a disk transducer head over the disk surface.

FIG. 2 is an enlarged partial plan view of rotary actuator arm 56 and clock head assembly 66 disposed over disk surface 50. Clock arm 80 maintains clock head 82 in a fixed position over the disk surface 50. Further, clock arm 80 maintains clock head 82 in radial alignment with the rotational center 110 (or disk center) of spindle assembly 48. Clock arm 80 extends over the disk surface 50, such that the pair of clock tracks 78 are written in the cleaner, data region of disk surface 50. As disk surface 50 rotates beneath clock head assembly 66, clock head 82 is employed to write the pair of clock patterns 78 on the disk surface, and subsequently read the clock patterns on the disk surface for providing the timing reference signal during the servo writing process. To achieve a uniform reference clock timer, a known or fixed quantity of clock pulses are written for inner clock track 77 and outer clock track 79 on the disk surface 50.

During the servo writing process, as the disk surface 50 rotates, servo wedges 112 are written to the disk surface 50 via disk transducer head 58. As the arm 56 is rotated by the positioning system, the disk transducer head 58 is incrementally moved in an arcuate path between an outer diameter 114 and an inner diameter 116 of the disk 46. The primary arc of the arcuate path is determined by the disk transducer head 58, the actuator arm 56 and its associated pivot point. As the disk transducer head 58 writes the servo sectors from outside diameter 114 to inside diameter 116, a portion of the inner clock track 77 and the outer clock track 78 are overwritten at the location of the servo sectors resulting in interruptions in the tracks 77 and 79.

Figure 3:
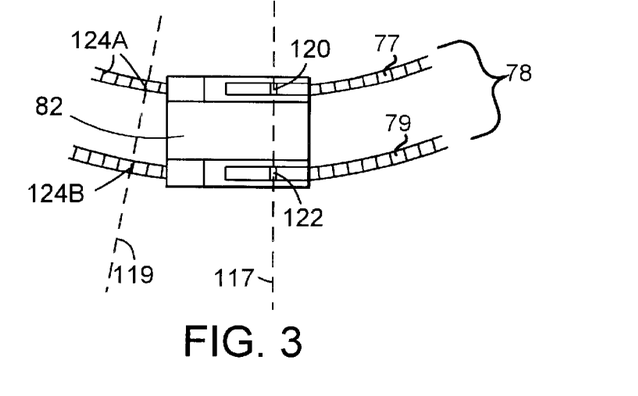
FIG. 3 is a plan view illustrating the clock head writing an outer clock track and an inner clock track on the disk surface of FIG. 2.

FIG. 3 is a plan view illustrating one exemplary embodiment of clock head 82 disposed over the pair of clock tracks 78. To achieve a reference timing clock from the pair of clock tracks 78, inner clock track 77 and outer clock track 79 include a known or fixed quantity of transitions 124 (indicated as 124A and 124B, respectively). Clock head 82 includes inner transducer 120 and outer transducer 122. Inner transducer 120 is provided for writing transitions on the disk surface 50 defining inner clock track 77. Outer transducer 122 is provided for writing transitions on the disk surface 50 defining outer clock track 79. Inner transducer 120 and outer transducer 122 are radially spaced apart on clock head 82, the distance which corresponds to the distance in which it is desired for outer clock track 79 to be radially spaced from inner clock track 77.

Inner transducer 120 and outer transducer 122 are aligned on a common axis extending radially from the center of the disk surface 50 and/or the rotational center 110 (indicated by dashed line 117). The radial alignment of inner transducer 120 and outer transducer 122 allows clock head 82 to write the pair of clock tracks 78 resulting in corresponding transitions 124A, 124B written to the disk surface 50 in radial alignment (indicated by dashed line 119). The physical radial alignment of transitions defining inner clock track 77 and outer clock track 79 defines a pair of continuous phase coherent radially spaced-apart clock tracks.

Figure 4:
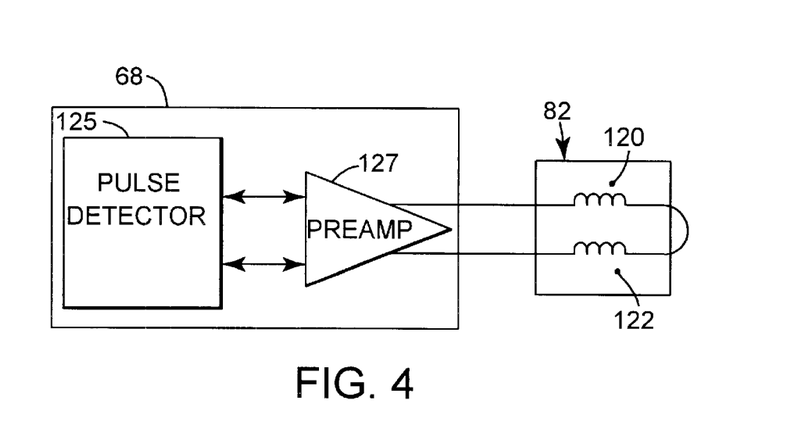
FIG. 4 is a schematic diagram illustrating the clock head and clock detection circuitry according to an embodiment of the present invention.

FIG. 4 is a schematic representation illustrating one preferred embodiment of clock head 82, electrically coupled to clock head preamp and pulse detector 68 (shown including preamp 127 and pulse detector 125). Inner transducer 120 and outer transducer 122 each comprise two-wire inductive-type elements that are connected in series to preamplifier 127. Because inner transducer 120 and outer transducer 122 are connected in series, and are electrically and mechanically symmetrical, and therefore in phase with each other, the peak-to-peak amplitude of the signal present at preamp 127 is the sum of the signal received from inner transducer 120 and the outer transducer 122.

Figure 5:
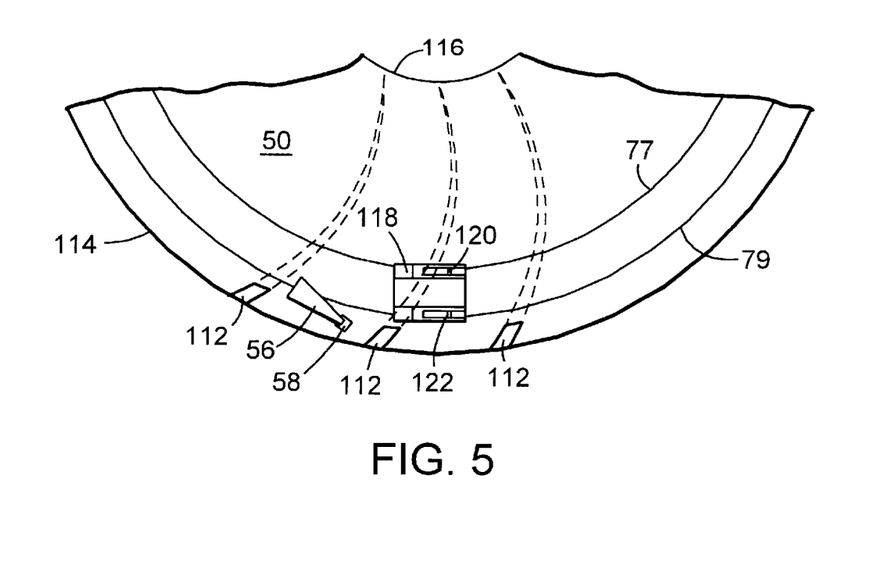
FIG. 5 is an enlarged partial plan view illustrating the disk transducer head beginning to write servo sectors on the disk surface of FIG. 2.

FIG. 5 is an enlarged partial plan view illustrating one exemplary embodiment of disk transducer head 58 beginning to write servo sectors 112 on disk surface 50. Inner clock track 77 and outer clock track 79 have been previously written on the disk surface 50 to provide the reference timing clock to the pattern generator 72 (shown in FIG. 1). Disk transducer 58 (with actuator arm 56 partially shown) starts writing servo sectors at the outside diameter 114 and is incrementally moved inward by positioning system 74 (shown in FIG. 1) toward outer clock track 79. A double amplitude clock signal is simultaneously read from inner clock track 77 and outer clock track 79 through inner transducer 120 and outer transducer 122, respectively.

Figure 6:
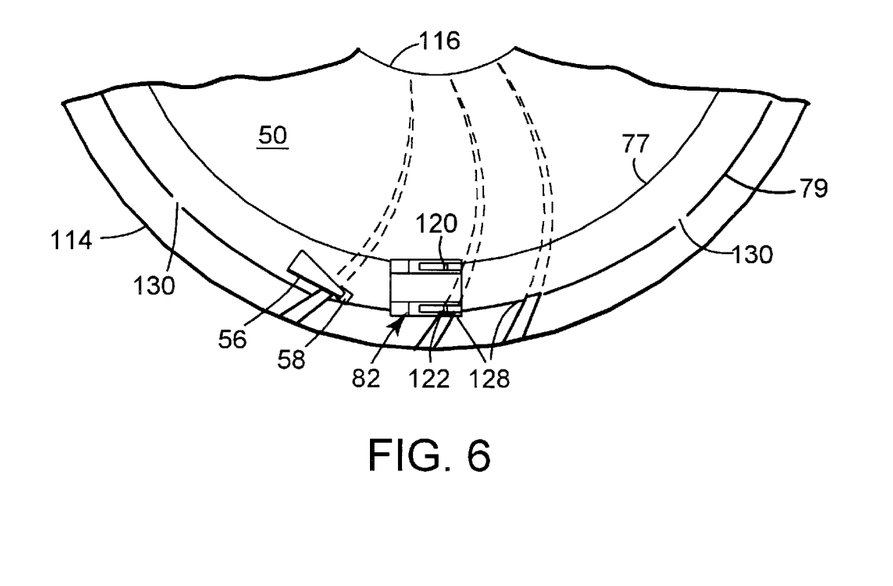
FIG. 6 is an enlarged partial plan view illustrating the disk transducer head writing servo sectors and forming interruptions in the outer clock track on the disk surface of FIG. 2.

In FIG. 6, as disk transducer head 58 is moved in an arcuate path towards inner diameter 116, disk transducer head 58 overwrites portions of outer clock track 79 with servo sectors, indicated at 128, resulting in interruptions in the outer clock track 79. The interruptions are shown at 130. The reference timing signal produced by clock head 82 when passing over the interruptions 130 in the outer clock track 79 comprises a single amplitude signal read by inner transducer 120 from inner clock track 77, and no signal present from outer transducer 122.

Figure 7:
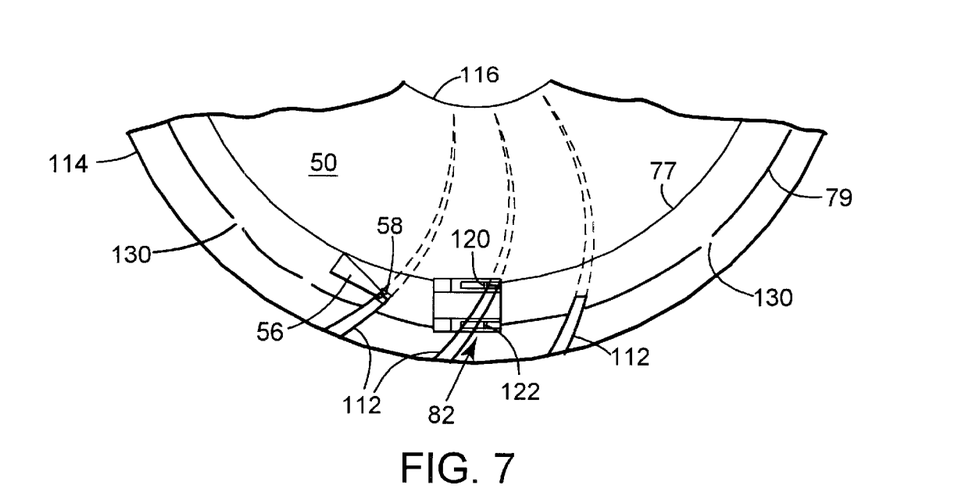
FIG. 7 is an enlarged partial plan view illustrating the disk transducer head writing servo sectors between the outer clock track and the inner clock track on the disk surface of FIG. 2.
Figure 8:
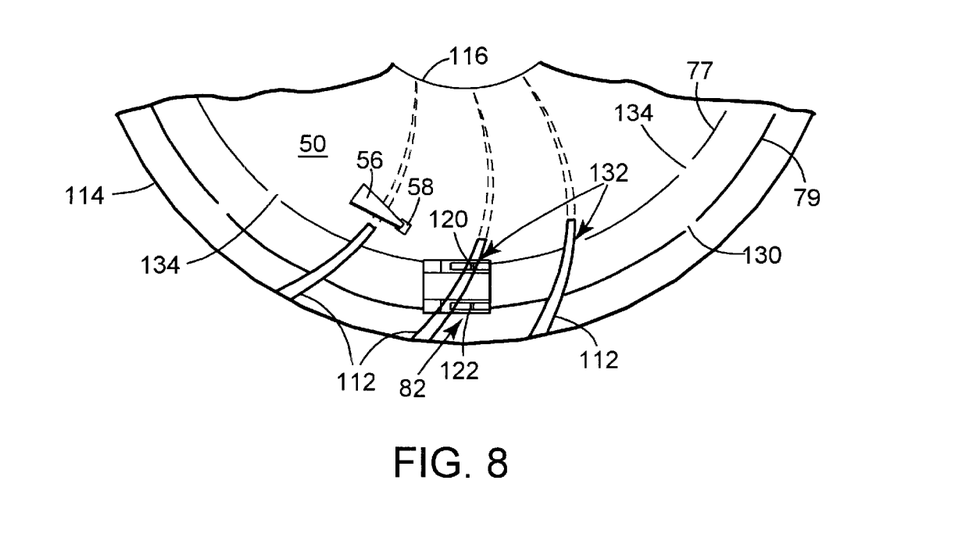
FIG. 8 is an enlarged partial plan view illustrating the disk transducer head overwriting and forming interruptions in the inner clock track on the disk surface of FIG. 2.

In FIG. 7, disk transducer head 58 continues to move incrementally from the outer diameter 114 to the inner diameter 116 writing servo sectors on the disk surface 50, and is shown writing servo sectors between inner clock track 77 and outer clock track 79. Referring to FIG. 8, as the disk transducer head 58 continues to moves in an arcuate path towards inner diameter 116, portions of inner clock track 77 are overwritten with servo sectors by the disk transducer head 58, indicated at 132. The overwriting of portions of the inner clock track 77 results in the inner clock track 77 having interruptions 134. Due to the arcuate path of the servo sector portions, interruptions 134 in the inner clock track 77 are displaced circumferentially from interruptions 130 in outer clock track 79. As disk surface 50 rotates, a continuous stream of clock pulses is read by the clock head 82 since clock head 82 continuously reads a reference timing clock from either inner clock track 77, outer clock track 79, or both inner clock track 77 and outer clock track 79.

Figure 9:
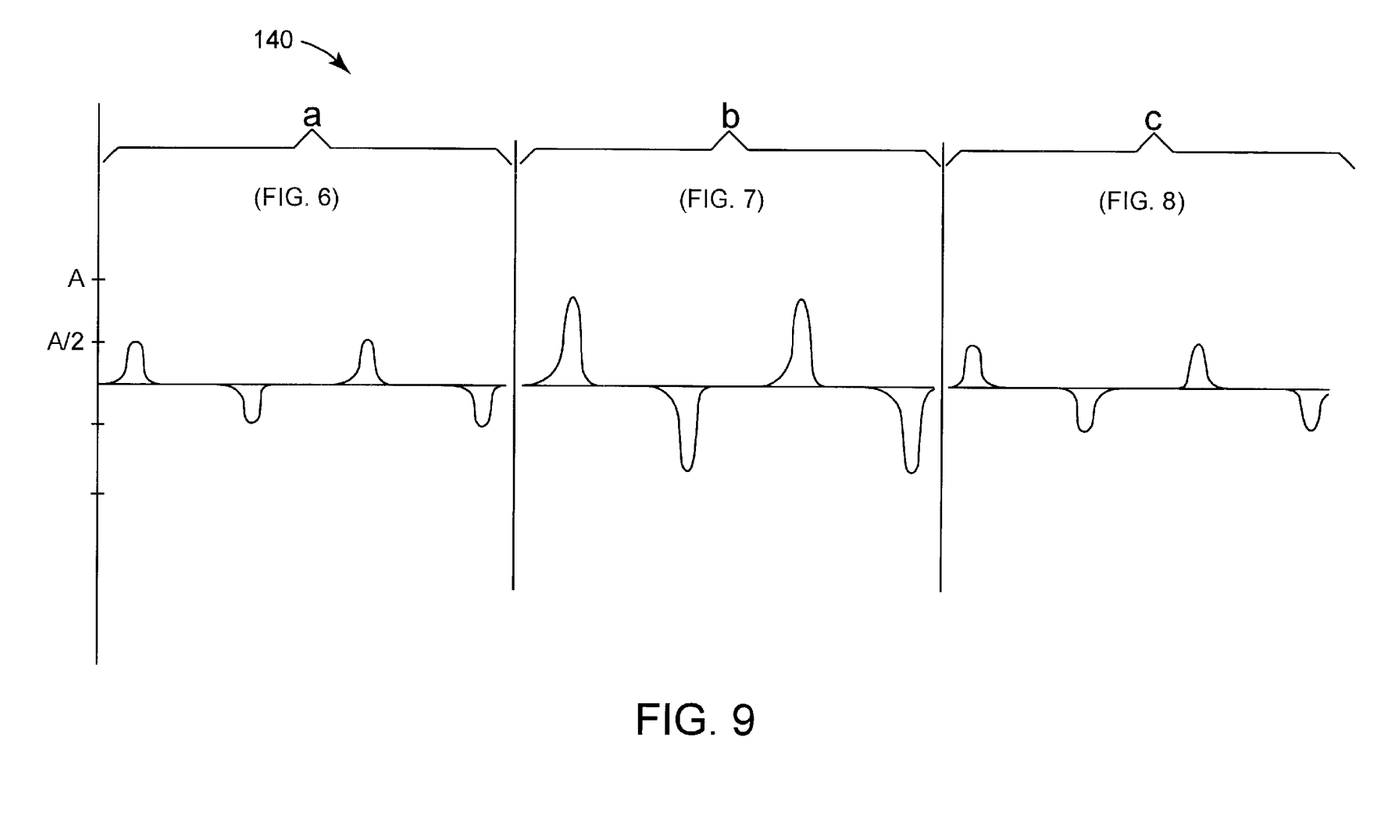
FIG. 9 shows the reference timing clock signal provided by the clock head as would be appropriate to FIGS. 6, 7 and 8.

In FIG. 9, one exemplary embodiment of a reference timing clock signal provided by the clock head 82 illustrating a continuous stream of clock pulses read from inner clock track 77 and outer clock track 79 is shown. Due to the arcuate path of disk transducer head 58, in combination with the spaced apart radial alignment of the clock assembly inner transducer 120 and outer transducer 122, a continuous stream of clock pulses is maintained for the reference timing clock provided to the pattern generator. In one embodiment of the invention, the radial path defined by the disk transducer head 58 provides a skew angle between 15 and 18 degrees, and inner transducer 120 and outer transducer 122 are in radial alignment and spaced apart radially about 0.070" (distance).

Figure 3A:
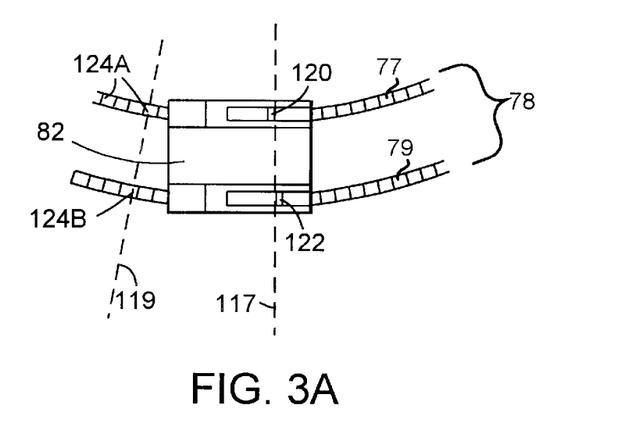
FIG. 3A is a plan view illustrating a clock head writing an outer clock track and an inner clock track on the disk surface of FIG. 2 according to another embodiment of the invention.

FIG. 3A is a plan view illustrating clock head 82 writing an inner clock track 77 and an outer clock track 79 on the disk surface 50 according to another embodiment of the invention. To accommodate a skew angle being less than the desired skew angle, inner transducer 120 and outer transducer 122 are in offset alignment from a common axis extending radially from the center of disk surface 50. For example, if the skew angle is such that an arcuate path defined by the disk transducer 58 is insufficient to produce inner and outer clock track interruptions that are circumferentially displaced from one another, the offset alignment in clock head 82 is suitable for enabling clock head 82 to read a continuous stream of clock pulses.

In portion a of FIG. 9, the reference timing clock signal is at single pulse amplitude A/2. In reference to FIG. 6, this occurs where a single amplitude signal is received from inner transducer 120, and a zero amplitude signal is received from outer transducer 122 due to the interruption 130 in the inner clock track 79 from servo sector 112. In portion b, the reference timing clock has a double amplitude A. In reference also to FIG. 7, this occurs as a result of a full amplitude clock signal detected by inner transducer 120 from inner clock track 77, and a full amplitude clock signal detected by outer transducer 122 from outer clock track 79. In portion c, the amplitude of the reference timing clock signal is again reduced to A/2. In reference to FIG. 8, this occurs when a full amplitude signal is received from outer transducer 122 and a zero amplitude or no signal is received from inner transducer 120 due to interruption 134 in the inner clock track 77.

Because inner transducer 120 and outer transducer 122 are connected in series with preamp 127, even though the amplitude varies, a continuous stream of clock pulses for the reference timing clock is received from clock head 82. The threshold of pulse detector 125 is set lower than amplitude A/2 (or the lowest detected amplitude) in order to maintain detection of the continuous clock stream. In one preferred embodiment, the detection threshold for pulse detector 125 is set at amplitude A/4.

Figure 10:
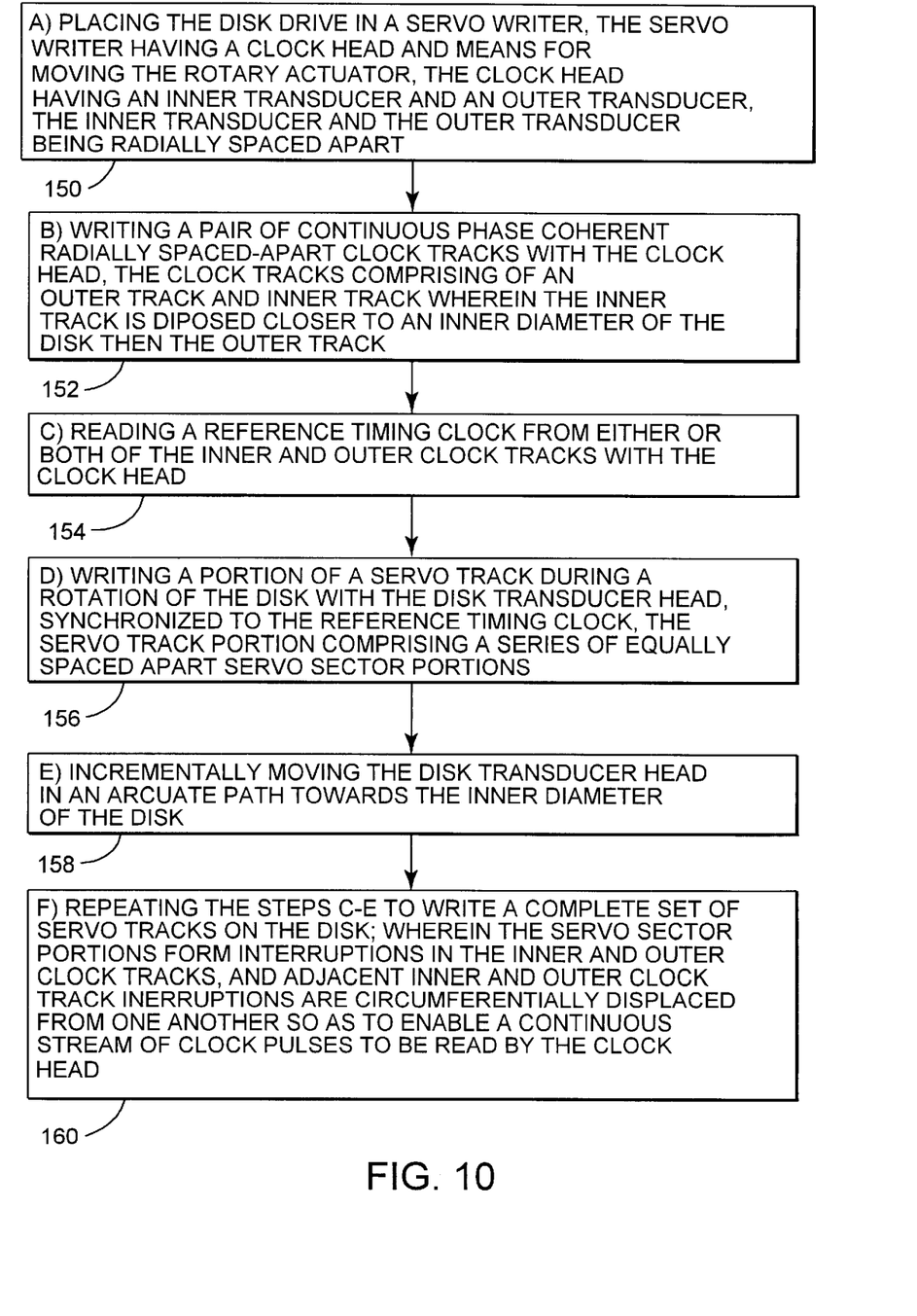
FIG. 10 is a flow chart illustrating a method of manufacturing a hard disk drive in accordance with the invention.

In FIG. 10, a flow diagram illustrating a method of manufacturing a disk drive in accordance with the present invention is shown. The method includes placing a disk in a servo track writer, which locates a pair of clock tracks in the data region of the disk, wherein the clock tracks are overwritten by the servo track writer while providing a continuous stream of reference timing information to the servo track writer.

In particular, the disk drive includes a rotary actuator and a disk. The rotary actuator includes a disk transducer head for reading and writing on the disk. In step 150, the disk drive is placed in the servo track writer. The servo track writer includes a clock transducer and means for moving the rotary actuator. The clock transducer includes an inner transducer and an outer transducer, the inner transducer and the outer transducer being radially spaced apart. In one preferred embodiment, the inner transducer is electrically coupled in series with the outer transducer. The inner transducer and outer transducer are radially aligned. The inner transducer and the outer transducer are positioned on a common clock head.

In step 152, a pair of continuous phase coherent radially spaced-apart clock tracks are written to the disk surface with the clock transducer. The clock tracks comprise an outer clock track and an inner clock track wherein the inner clock track is disposed closer to an inner diameter of the disk than the outer clock track. In step 154, a reference timing clock is read from either or both of the inner and the outer clock tracks with the clock transducer.

A portion of a servo track is written with the disk transducer head during rotation of the disk, synchronized to the referenced timing clock, the servo track portion comprising a series of equally spaced apart servo sector portions. In step 158, the disk transducer head is incrementally moved in an arcuate path towards the inner diameter of the disk. In one preferred aspect, a positioning system is coupled to the rotary actuator and employed for incrementally moving the disk transducer head in an arcuate path towards the inner diameter of the disk. The positioning system may include a push pin, wherein the rotary actuator is electrically biased against the push pin. In step 160, the steps of reading a reference timing clock, writing a portion of a servo track, and incrementally moving the disk transducer head are repeated to write a complete set of servo tracks on the disk. The servo sector portions form interruptions in the inner and outer clock tracks, and adjacent inner and outer clock track interruptions are circumferentially displaced from one another so as to enable a continuous stream of clock pulses to be read by the clock transducer.

We claim:

1. A method of manufacturing a disk drive having a rotary actuator and a disk, the rotary-actuator having a disk transducer head for reading and writing on the disk, the method comprising the steps of:
   a) placing the disk drive in a servo track writer, the servo track writer having a clock head and means for moving the rotary actuator, the clock head having an inner transducer and an outer transducer, the inner transducer and the outer transducer being radially spaced apart;
   b) writing a pair of continuous phase coherent radially spaced-apart clock tracks with the clock transducer, the clock tracks comprising an outer clock track and an inner clock track wherein the inner clock track is disposed closer to an inner diameter of the disk than the outer clock track;
   c) reading a reference timing clock from either or both of the inner and outer clock tracks with the clock head;
   d) writing a portion of a servo track during a rotation of the disk with the disk transducer head, synchronized to the reference timing clock, the servo track portion comprising a series of equally spaced apart servo sector portions;
   e) incrementally moving the disk transducer head in an arcuate path towards the inner diameter of the disk; and
   f) repeating the steps c–e to write a complete set of servo tracks on the disk;
   wherein the servo sector portions form interruptions in the inner and outer clock tracks, and adjacent inner and outer clock track interruptions are circumferentially displaced from one another so as to enable a continuous stream of clock pulses to be read by the clock head.

2. The method of claim 1, further comprising the step of electrically coupling the inner transducer in series with the outer transducer.

3. The method of claim 1, wherein the inner transducer and the outer transducer are aligned on a common axis extending radially from the center of the disk.

4. The method of claim 1, wherein the inner transducer and the outer transducer are in offset alignment from a common axis extending radially from the center of the disk.

5. The method of claim 1, wherein the pair of continuous phase coherent radially spaced-apart clock tracks are written on a data portion of the disk.

6. The method of claim 1, further comprising the steps of defining the inner and outer clock tracks as a series of clock transitions on the disk.

7. The method of claim 1, further comprising the step of providing a reference timing clock signal to a phase locked-loop; and generating a timing error signal in response to the timing clock signal.

8. The method of claim 7, further comprising the step of providing the timing error signal to a voltage controlled oscillator for correcting the reference timing clock output to the pattern generator, wherein the disk transducer head is responsive to the pattern generator for writing transitions defining the servo sector portion.

9. The method of claim 1, wherein the step of incrementally moving the disk transducer head in an arcuate path towards the inner diameter of the disk further includes the step of coupling a positioning system to the rotary actuator.

10. The method of claim 1, wherein the positioning system includes a push-pin, and further comprising the step of electrically biasing the rotary actuator against the push-pin.

11. The method of claim 1, further comprising the step of removing the disk drive from the servo track writer.

12. The method of claim 11, further comprising the step of coupling the disk drive to a disk drive control system.

* * * * *

UNITED STATES PATENT AND TRADEMARK OFFICE
CERTIFICATE OF CORRECTION

PATENT NO. : 6,388,833 B1
DATED : May 14, 2002
INVENTOR(S) : Daniel M. Golowka and David M. Suckling It is certified that error appears in the above-identified patent and that said Letters Patent is hereby corrected as shown below:

<u>Title page,</u>
Item [54], Title, METHOD FOR MANUFACTURING A DISK DRIVE HAVING AN OVERWRITEABLE CLOCK TRACK," should read -- METHOD FOR MANUFACTURING A DISK DRIVE INCLUDING WRITING DUAL CLOCK TRACKS FOR SERVO WRITING --.

Signed and Sealed this

Tenth Day of December, 2002

JAMES E. ROGAN
*Director of the United States Patent and Trademark Office*